(12) United States Patent
Hwang et al.

(10) Patent No.: US 9,621,879 B2
(45) Date of Patent: Apr. 11, 2017

(54) METHOD OF DRIVING A DISPLAY PANEL CAPABLE OF DISPLAYING TWO-DIMENSIONAL AND THREE-DIMENSIONAL IMAGES, AND DISPLAY APPARATUS PERFORMING THE METHOD

(71) Applicant: SAMSUNG DISPLAY CO., LTD., Yongin, Gyeonggi-Do (KR)

(72) Inventors: Jun-Ho Hwang, Asan-si (KR); Hyun-Sik Yoon, Asan-si (KR)

(73) Assignee: SAMSUNG DISPLAY CO., LTD., Yongin, Gyeonggi-Do (KR)

( * ) Notice: Subject to any disclaimer, the term of this patent is extended or adjusted under 35 U.S.C. 154(b) by 163 days.

(21) Appl. No.: 14/326,689

(22) Filed: Jul. 9, 2014

(65) Prior Publication Data

US 2015/0221262 A1    Aug. 6, 2015

(30) Foreign Application Priority Data

Feb. 5, 2014    (KR) .................... 10-2014-0013170

(51) Int. Cl.
*G09G 3/36* (2006.01)
*H04N 13/04* (2006.01)
*G09G 3/00* (2006.01)

(52) U.S. Cl.
CPC ....... *H04N 13/0454* (2013.01); *G09G 3/3696* (2013.01); *H04N 13/0438* (2013.01); *G09G 3/003* (2013.01); *G09G 3/3614* (2013.01); *G09G 2320/0276* (2013.01); *G09G 2320/0673* (2013.01)

(58) Field of Classification Search
CPC ............. G09G 3/3614; H04N 13/0454; H04N 13/0438
USPC .................................................... 345/97, 690
See application file for complete search history.

(56) References Cited

U.S. PATENT DOCUMENTS

| 2010/0039503 | A1  | 2/2010 | Lin et al. | |
| 2011/0090319 | A1* | 4/2011 | Kim ........................ | G09G 3/003 348/51 |
| 2011/0175943 | A1* | 7/2011 | Ahn ......................... | G09G 3/20 345/690 |

(Continued)

FOREIGN PATENT DOCUMENTS

KR    1020120075036    7/2012

*Primary Examiner* — Jonathan Blancha
(74) *Attorney, Agent, or Firm* — F. Chau & Associates, LLC

(57) ABSTRACT

A method of driving a display panel includes determining a first black gap corresponding to a 2D mode and a second black gap corresponding to a 3D mode. The first and second black gaps are different from each other, the first and second black gaps correspond to a voltage difference between a black voltage of a first polarity and a black voltage of a second polarity, and the first and second polarities are opposite to each other with respect to a reference voltage. The method further includes dividing a voltage difference between a white voltage of the first polarity and the black voltage of the first polarity to generate a plurality of gamma voltages of the first polarity, and dividing a voltage difference between a white voltage of the second polarity and the black voltage of the second polarity to generate a plurality of gamma voltages of the second polarity.

16 Claims, 8 Drawing Sheets

(56) References Cited

U.S. PATENT DOCUMENTS

2011/0273440 A1\* 11/2011 Park .................. G09G 3/003
                                                    345/419
2013/0076864 A1   3/2013 Takahashi et al.
2013/0088532 A1   4/2013 Shin et al.
2013/0113787 A1   5/2013 Shin et al.
2015/0206496 A1\* 7/2015 Bae .................. G09G 3/3696
                                                     348/59

\* cited by examiner

| | 2D | 3D |
|---|---|---|
| VGMA1 | 2D_GMA1 | 3D_GMA1 |
| VGMA2 | 2D_GMA2 | 3D_GMA2 |
| VGMA3 | 2D_GMA3 | 3D_GMA3 |
| ⋮ | ⋮ | ⋮ |
| VGMA8 | 2D_GMA8 | 3D_GMA8 |
| VGMA9 | 2D_GMA9 | 3D_GMA9 |
| VGMA10 | 2D_GMA10 | 3D_GMA10 |
| VGMA11 | 2D_GMA11 | 3D_GMA11 |
| ⋮ | ⋮ | ⋮ |
| VGMA16 | 2D_GMA16 | 3D_GMA16 |

METHOD OF DRIVING A DISPLAY PANEL CAPABLE OF DISPLAYING TWO-DIMENSIONAL AND THREE-DIMENSIONAL IMAGES, AND DISPLAY APPARATUS PERFORMING THE METHOD

CROSS-REFERENCE TO RELATED APPLICATIONS

This application claims priority under 35 U.S.C. §119 to Korean Patent Application No. 10-2014-0013170 filed on Feb. 5, 2014, the disclosure of which is incorporated by reference herein in its entirety.

TECHNICAL FIELD

Exemplary embodiments of the present inventive concept relate to a method of driving a display panel and a display apparatus performing the method. More particularly, exemplary embodiments of the present inventive concept relate to a method of driving a display panel in a manner that improves the display quality of a two-dimensional (2D) image and a three-dimensional (3D) image and a display apparatus performing the method.

DISCUSSION OF THE RELATED ART

Recently, a display apparatus capable of displaying two-dimensional (2D) images and three-dimensional (3D) images has been developed. In a 3D mode of the display apparatus, 2D images different from each other may be respectively provided to both eyes of an observer such that a 3D stereoscopic image is displayed. For example, when the observer views a pair of 2D images using both eyes, the 2D images may be effectively blended and processed in the observer's brain to be recognized as a 3D stereoscopic image.

The 3D stereoscopic display apparatus may be classified into a "glasses" mode and a "non-glasses" mode.

In the "glasses" mode, the display apparatus may include an active polarizing panel that polarizes light for a left-eye image and a right-eye image displayed on the display panel, and polarized light glasses worn by the observer may receive the left-eye image and the right-eye image from the active polarizing panel. In the "non-glasses" mode, the display apparatus may include a barrier panel that includes a barrier blocking light and an opening transmitting light. A left-eye image emitted from a left-eye pixel of the display panel and a right-eye image emitted from a right-eye pixel of the display panel may be provided to the observer's eyes through the barrier panel.

SUMMARY

Exemplary embodiments of the present inventive concept provide a method of driving a display panel for improving the display quality of a 2D image and a 3D image.

Exemplary embodiments of the present inventive concept provide a display apparatus performing the method.

According to an exemplary embodiment of the present inventive concept, a method of driving a display panel includes determining a black gap of a two-dimensional (2D) mode and a black gap of a three-dimensional (3D) mode different from each other, the black gap corresponding to a voltage difference between a black voltage of a first polarity and a black voltage of a second polarity opposite to the first polarity with respect to a reference voltage, dividing a voltage difference between a white voltage and the black voltage of the first polarity to generate a plurality of gamma voltages of the first polarity, and dividing a voltage difference between a white voltage and the black voltage of the second polarity to generate a plurality of gamma voltages of the second polarity.

In an exemplary embodiment, the black gap of the 2D mode may be greater than the black gap of the 3D mode.

In an exemplary embodiment, the white voltage of the first polarity in the 2D mode may be equal to the white voltage of the first polarity in the 3D mode, and the white voltage of the second polarity in the 2D mode may be equal to the white voltage of the second polarity in the 3D mode.

In an exemplary embodiment, the method may further include generating a plurality of data voltages of the first and second polarities using the plurality of gamma voltages of the first and second polarities to drive the plurality of data lines.

According to an exemplary embodiment of the present inventive concept, a method of driving a display panel includes generating a plurality of reference gamma voltages of a 2D mode and a plurality of reference gamma voltages of a 3D mode different from at least one among the plurality of reference gamma voltages of the 2D mode based on a mode signal which corresponds to a driving mode of the display panel, generating a plurality of gamma voltages using the plurality of reference gamma voltages, and generating a plurality of data voltages using the plurality of gamma voltages to drive the plurality of data lines.

In an exemplary embodiment, the plurality of reference gamma voltages of the 2D mode may include a first 2D white voltage and a first 2D black voltage having a first polarity and a second 2D white voltage and a second 2D black voltage having a second polarity opposite to the first polarity with respect to a reference voltage, the plurality of reference gamma voltages of the 3D mode may include a first 3D white voltage and a first 3D black voltage having the first polarity and a second 3D white voltage and a second 3D black voltage having the second polarity, and a first black gap between the first 2D black voltage and the second 2D black voltage may be greater than a second black gap between the first 3D black voltage and the second 3D black voltage.

In an exemplary embodiment, a first middle gap between the first 2D white voltage and the first 2D black voltage may be less than a second middle gap between the first 3D white voltage and the first 3D black voltage, and a first middle gap between the second 2D white voltage and the second 2D black voltage may be less than a second middle gap between the second 3D white voltage and the second 3D black voltage.

In an exemplary embodiment, the first 2D white voltage may be equal to the first 3D white voltage and the second 2D white voltage may be equal to the second 3D white voltage.

In an exemplary embodiment, generating the plurality of reference gamma voltages may include dividing a voltage difference between the first 2D white voltage and the first 2D black voltage based on a 2D gamma curve to generate a plurality of 2D gamma voltages of the first polarity, and dividing a voltage difference between the second 2D white voltage and the second 2D black voltage based on the 2D gamma curve to generate a plurality of 2D gamma voltages of the second polarity.

In an exemplary embodiment, generating the plurality of reference gamma voltages may further include dividing a voltage difference between the first 3D white voltage and the first 3D black voltage based on a 3D gamma curve to generate a plurality of 3D gamma voltages of the first polarity, and dividing a voltage difference between the second 3D white voltage and the second 3D black voltage based on the 3D gamma curve to generate a plurality of 3D gamma voltages of the second polarity.

According to an exemplary embodiment of the present inventive concept, a display apparatus includes a display panel which includes a plurality of pixels connected to a plurality of data lines and a plurality of gate lines crossing the plurality of data lines, a reference gamma generator configured to generate a plurality of reference gamma voltages of a 2D mode and a plurality of reference gamma voltages of a 3D mode different from those of the 2D mode based on a mode signal which corresponds to a driving mode of the display panel, a gamma generator configured to divide voltage differences between the plurality of reference gamma voltages to generate a plurality of gamma voltages, and a data driver configured to generate a plurality of data voltages using the plurality of gamma voltages to drive the plurality of data lines.

In an exemplary embodiment, the plurality of reference gamma voltages of the 2D mode may include a first 2D white voltage and a first 2D black voltage having a first polarity and a second 2D white voltage and a second 2D black voltage having a second polarity opposite to the first polarity with respect to a reference voltage, the plurality of reference gamma voltages of the 3D mode may include a first 3D white voltage and a first 3D black voltage having the first polarity and a second 3D white voltage and a second 3D black voltage having the second polarity, and a first black gap between the first 2D black voltage and the second 2D black voltage may be more than a second black gap between the first 3D black voltage and the second 3D black voltage.

In an exemplary embodiment, a first middle gap between the first 2D white voltage and the first 2D black voltage may be less than a second middle gap between the first 3D white voltage and the first 3D black voltage, and a first middle gap between the second 2D white voltage and the second 2D black voltage may be less than a second middle gap between the second 3D white voltage and the second 3D black voltage.

In an exemplary embodiment, the first 2D white voltage may be equal to the first 3D white voltage and the second 2D white voltage is equal to the second 3D white voltage.

In an exemplary embodiment, the gamma generator may be configured to divide a voltage difference between the first 2D white voltage and the first 2D black voltage based on a 2D gamma curve to generate a plurality of 2D gamma voltages of the first polarity, and to divide a voltage difference between the second 2D white voltage and the second 2D black voltage based on the 2D gamma curve to generate a plurality of 2D gamma voltages of the second polarity.

In an exemplary embodiment, the gamma generator may be configured to divide a voltage difference between the first 3D white voltage and the first 3D black voltage based on a 3D gamma curve to generate a plurality of 3D gamma voltages of the first polarity, and to divide a voltage difference between the second 3D white voltage and the second 3D black voltage based on the 3D gamma curve to generate a plurality of 3D gamma voltages of the second polarity.

In an exemplary embodiment, the reference gamma generator includes a resistor string including a first resistor element, a second resistor element, a third resistor element, a fourth resistor element, a fifth resistor element, and a sixth resistor element which are sequentially connected to each other, a first output terminal connected to a first node which connects the first and second resistor elements and outputs a first white voltage, a second output terminal connected to a second node which connects the second and third resistor elements and outputs a first black voltage, a third output terminal connected to a third node which connects the third and fourth resistor elements and outputs a second first black voltage, a fourth output terminal connected to the fourth node which connects the fourth and fifth resistor elements and outputs a second white voltage, and a resistance controller connected to the second and third nodes and controlling a resistance value between the second and third nodes in response to the mode signal.

In an exemplary embodiment, when the mode signal is a 2D mode signal, the resistance controller may decrease the resistance value between the second and third nodes.

In an exemplary embodiment, the resistance controller may include a parallel resistor element connected to the third resistor element in parallel, a first transistor connected to the second and third nodes through the parallel resistor element, and a second transistor turning-on or turning-off the first transistor in response to the mode signal.

In an exemplary embodiment, when the mode signal is a 2D mode signal, the first transistor may be turned-on and the third resistor element between the second and third nodes is connected to the parallel resistor element in parallel, and when the mode signal is a 3D mode signal, the first transistor may be turned-off and the third resistor element between the second and third nodes is not connected to the parallel resistor element.

According to exemplary embodiments of the present inventive concept, the black gap between the black voltage of the first polarity and the black voltage of the second polarity are determined to be different from each other according to the 2D mode and the 3D mode such that improved performance may be obtained in the 2D mode and the 3D mode.

BRIEF DESCRIPTION OF THE DRAWINGS

The above and other features of the present inventive concept will become more apparent by describing in detail exemplary embodiments thereof with reference to the accompanying drawings, in which.

DETAILED DESCRIPTION OF THE EXEMPLARY EMBODIMENTS

Hereinafter, exemplary embodiments of the present inventive concept will be described in detail with reference to the accompanying drawings.

Figure 1:
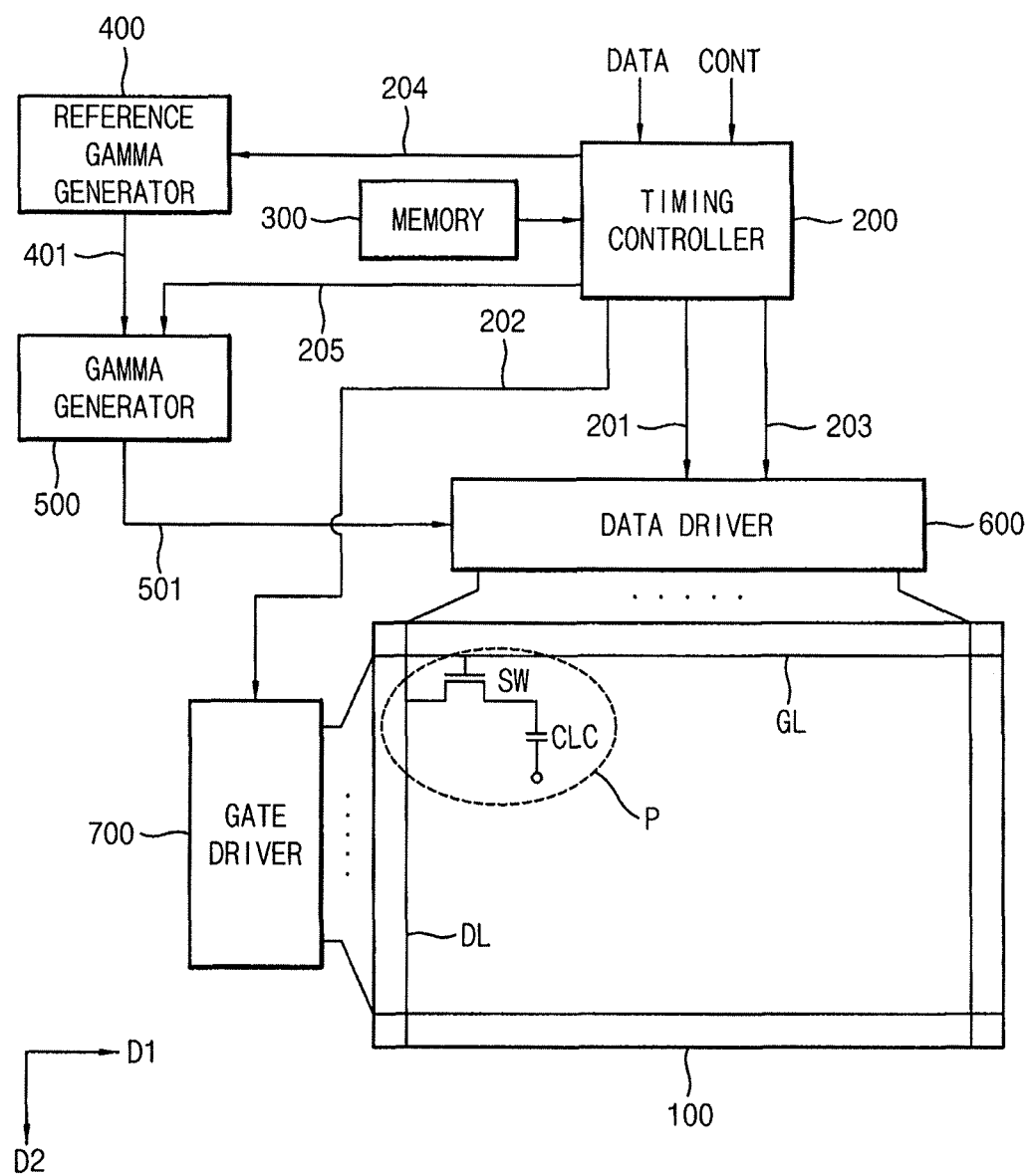
FIG. 1 is a block diagram illustrating a display apparatus according to an exemplary embodiment of the present inventive concept.

FIG. 1 is a block diagram illustrating a display apparatus according to an exemplary embodiment of the present inventive concept.

Referring to FIG. 1, the display apparatus may include a display panel 100 and a panel driving module. The panel driving module may include a timing controller 200, a memory 300, a reference gamma generator 400, a gamma generator 500, a data driver 600, and a gate driver 700.

The display panel 100 may include a plurality of gate lines GL, a plurality of data lines DL, and a plurality of pixels P which is electrically connected to the gate lines GL and the data lines DL. The gate lines GL extend in a first direction D1 and the data lines DL extend in a second direction D2 crossing the first direction D1.

Each of the pixels P may include a switching element SW, a liquid crystal capacitor CLC electrically connected to the switching element SW, and a storage capacitor electrically connected to the liquid crystal capacitor CLC. The pixels may be arranged in a matrix formation.

The timing controller 200 is configured to receive input image data DATA and an input control signal CONT from an external system. The input image data DATA may include, for example, red image data R, green image data G, and blue image data B, however the input image data DATA is not limited thereto. The input control signal CONT includes a mode signal 204 which indicates whether a driving mode of the display panel 100 is a two-dimensional (2D) mode or a three-dimensional (3D) mode. The input control signal CONT may further include a main clock signal and/or a data enable signal. The input control signal CONT may further include a vertical sync signal and/or a horizontal sync signal.

The timing controller 200 is configured to generate a plurality of timing control signals based on the input control signal CONT. The timing control signal may include a data control signal 201 which controls a driving timing of the data driver 600 and a gate control signal 202 which controls a driving timing of the gate driver 700.

The timing controller 200 is configured to render the input image data DATA to be image data 203 corresponding to the driving mode based on the mode signal 204. For example, the image data 203 may correspond to 2D image data or 3D image data. The timing controller 200 is configured to provide the image data 203 to the data driver 600.

In the 2D mode, the image data 203 may include a 2D data signal. In the 3D mode, the image data 203 may include a left-eye data signal and a right-eye data signal. In the 3D mode, the image data 203 may further include a black data signal inserted between the left-eye data signal and the right-eye data signal.

In addition, the timing controller 200 may correct the input image data DATA through various compensation algorithms. The various compensation algorithms may include, for example, an algorithm for an adaptive color correction (ACC) and an algorithm for a dynamic capacitance compensation (DCC) which corrects the input image data of a current frame using input image data of a previous frame, however the compensation algorithms are not limited thereto.

The timing controller 200 is configured to provide the reference gamma generator 400 with the mode signal 204. In an exemplary embodiment, when the mode signal 204 has a low level, the mode signal 204 may be a 2D mode signal, and when the mode signal 204 has a high level, the mode signal 204 may be a 3D mode signal.

The timing controller 200 is configured to read out 2D or 3D gamma data 205 from the memory 300 based on the mode signal 204, and to provide the gamma generator 500 with the 2D or 3D gamma data 205.

The memory 300 stores 2D gamma data determined based on a 2D gamma curve corresponding to a 2D image, and 3D gamma data determined based on a 3D gamma curve corresponding to a 3D image.

The reference gamma generator 400 is configured to generate a plurality of 2D reference gamma voltages 401 or a plurality of 3D reference gamma voltages 401 based on the mode signal 204.

The plurality of 2D reference gamma voltages 401 includes a first 2D white voltage and a first 2D black voltage which have a first polarity, and a second 2D black voltage and a second 2D white voltage which have a second polarity opposite to the first polarity with respect to a reference voltage. The reference voltage may be a common voltage which is applied to the liquid crystal capacitor CLC. A first black gap between the first 2D black voltage and the second 2D black voltage has a first voltage difference. In the 2D mode, the first black gap corresponds to the first voltage difference.

The plurality of 3D reference gamma voltages includes a first 3D white voltage, a first 3D black voltage, a second 3D black voltage, and a second 3D white voltage. A second black gap between the first 3D black voltage and the second 3D black voltage has a second voltage difference less than the first voltage difference. In the 3D mode, the second black gap corresponds to the second voltage difference. In an exemplary embodiment, the second black gap is smaller than the first black gap.

The gamma generator 500 generates and provides a plurality of 2D or 3D gamma voltages 501 to the data driver 600 using the 2D or 3D reference gamma voltages 401 received from the reference gamma generator 400 and the 2D or 3D gamma data 205 received from the timing controller 200 based on the driving mode.

The data driver 600 converts the 2D or 3D image data 203 received from the timing controller 200 into data voltages of the first and second polarities using the 2D or 3D gamma voltages 501 of the first and second polarities received from the gamma generator 500. The data driver 600 outputs the data voltages of the first and second polarities to the data lines DL.

The gate driver 700 generates a plurality of gate signals under the control of the timing controller 200 and sequentially outputs the plurality of gate signals to the gate lines GL.

Figure 2A:
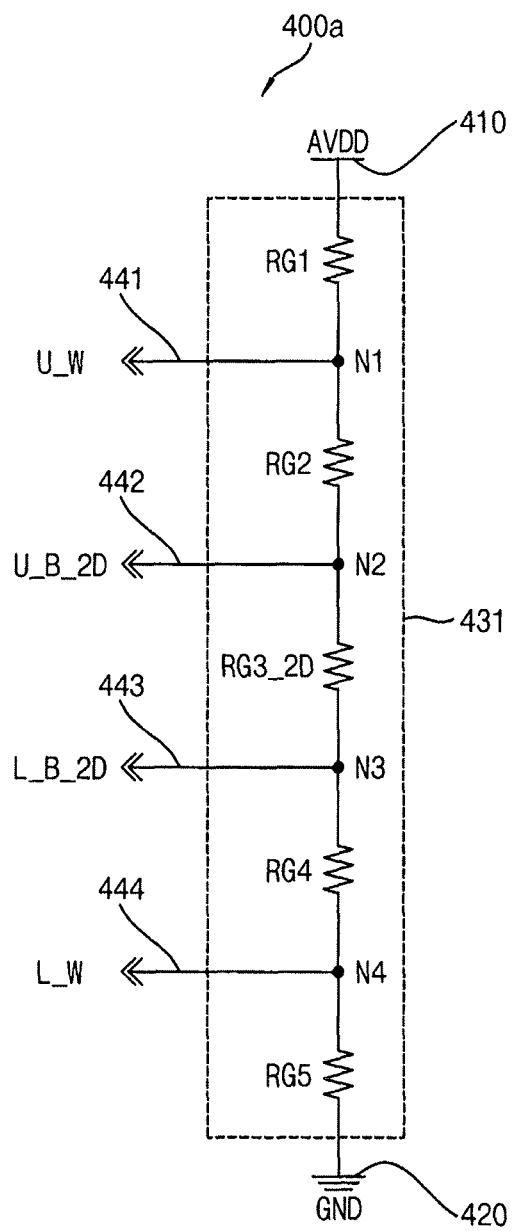
FIGS. 2A and 2B are conceptual diagrams illustrating the reference gamma generator of FIG. 1 according to an exemplary embodiment of the present inventive concept.
Figure 2B:
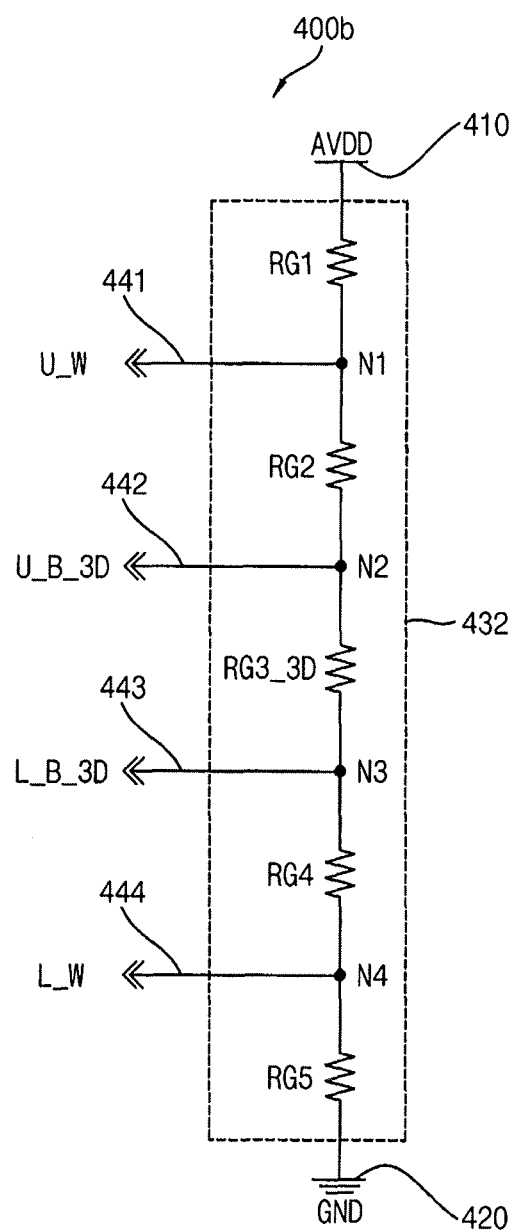

FIGS. 2A and 2B are conceptual diagrams illustrating the reference gamma generator of FIG. 1 according to an exemplary embodiment of the present inventive concept.

Referring to FIGS. 2A and 2B, the reference gamma generator 400 may include a 2D reference gamma generator 400a and a 3D reference gamma generator 400b. In response to the mode signal 204, the 2D reference gamma generator 400a or the 3D reference gamma generator 400b is selectively driven such that the plurality of 2D reference gamma voltages 401 or the plurality of 3D reference gamma voltages 401 is generated. The 2D reference gamma generator 400a includes a first voltage terminal 410, a second voltage terminal 420, a 2D resistor string 431, a first output terminal 441, a second output terminal 442, a third output terminal 443, and a fourth output terminal 444. The 3D reference gamma generator 400b includes a first voltage terminal 410, a second voltage terminal 420, a 3D resistor string 432, a first output terminal 441, a second output terminal 442, a third output terminal 443, and a fourth output terminal 444.

The first voltage terminal 410 receives a source voltage AVDD.

The second voltage terminal 420 receives a ground voltage GND.

Each of the 2D and 3D resistor strings 431 and 432 includes a plurality of resistor elements which are connected to each other in a string formation.

As shown in FIG. 2A, in the 2D mode, the 2D resistor string 431 includes a first resistor element RG1, a second resistor element RG2, a third resistor element RG3_2D, a fourth resistor element RG4, and a fifth resistor element RG5. The first to fifth resistor elements RG1, RG2, RG3_2D, RG4, and RG5 are arranged between the first voltage terminal 410 and the second voltage terminal 420, and each of the first to fifth resistor elements RG1, RG2, RG3_2D, RG4, and RG5 may include at least one resistor element.

The first output terminal 441 is connected to a first node N1 which connects the first and second resistor elements RG1 and RG2. The first output terminal 441 outputs a first 2D white voltage U_W, which is divided from the source voltage AVDD by the first and second resistor elements RG1 and RG2.

The second output terminal 442 is connected to a second node N2 which connects the second and third resistor elements RG2 and RG3_2D. The second output terminal 442 outputs a first 2D black voltage U_B_2D, which is divided from a voltage of the first node N1 by the second and third resistor elements RG2 and RG3_2D.

The third output terminal 443 is connected to a third node N3 which connects the third and fourth resistor elements RG3_2D and RG4. The third output terminal 443 outputs a second 2D black voltage L_B_2D, which is divided from a voltage of the second node N2 by the third and fourth resistor elements RG3_2D and RG4.

The fourth output terminal 444 is connected to a fourth node N4 which connects the fourth and fifth resistor elements RG4 and RG5. The fourth output terminal 444 outputs a second 2D white voltage L_W, which is divided from a voltage of the third node N3 by the fourth and fifth resistor elements RG4 and RG5.

In the 2D mode, the third resistor element RG3_2D, which controls the first 2D black voltage U_B_2D and the second 2D black voltage L_B_2D, has a first resistance value. Thus, the first voltage difference between the first 2D black voltage U_B_2D and the second 2D black voltage L_B_2D may be determined by the first resistance value of the third resistor element RG3_2D. The first voltage difference between the first and second 2D black voltages U_B_2D and L_B_2D corresponds to the first black gap.

As shown in FIG. 2B, in the 3D mode, the 3D resistor string 432 includes a first resistor element RG1, a second resistor element RG2, a third resistor element RG3_3D, a fourth resistor element RG4, and a fifth resistor element RG5. The first to fifth resistor elements RG1, RG2, RG3_3D, RG4, and RG5 are arranged between the first voltage terminal 410 and the second voltage terminal 420, and each of the first to fifth resistor elements RG1, RG2, RG3_3D, RG4, and RG5 may include at least one resistor element.

In the 3D mode, resistance values of the first, second, fourth, and fifth resistor elements RG1, RG2, RG4, and RG5 may be substantially the same as those of the first, second, fourth, and fifth resistor elements RG1, RG2, RG4, and RG5 in the 2D mode.

The third resistor element RG3_3D in the 3D mode has a second resistance value different from the first resistance value of the third resistor element RG3_2D in the 2D mode. In an exemplary embodiment, the second resistance value is greater than the first resistance value.

The first output terminal 441 is connected to a first node N1 which connects the first and second resistor elements RG1 and RG2. The first output terminal 441 outputs a first 3D white voltage U_W which is equal to the first 2D white voltage U_W in the 2D mode.

The second output terminal 442 is connected to a second node N2 which connects the second and third resistor elements RG2 and RG3_3D. The second output terminal 442 outputs a first 3D black voltage U_B_3D, which is divided from a voltage of the first node N1 by the second and third resistor elements RG2 and RG3_3D.

The third output terminal 443 is connected to a third node N3 which connects the third and fourth resistor elements RG3_3D and RG4. The third output terminal 443 outputs a second 3D black voltage L_B_3D, which is divided from a voltage of the second node N2 by the third and fourth resistor elements RG3_3D and RG4.

The fourth output terminal 444 is connected to a fourth node N4 which connects the fourth and fifth resistor elements RG4 and RG5. The fourth output terminal 444 outputs a second 3D white voltage L_W, which is equal to the second 2D white voltage L_W in the 2D mode.

Thus, the second voltage difference between the first 3D black voltage U_B_3D and the second 3D black voltage L_B_3D is determined by the second resistance value of the third resistor element RG3_3D. The second voltage difference between the first and second 3D black voltages U_B_3D and L_B_3D corresponds to the second black gap corresponding to the second resistance value. The second black gap is less than the first black gap.

Figures 3, 4:
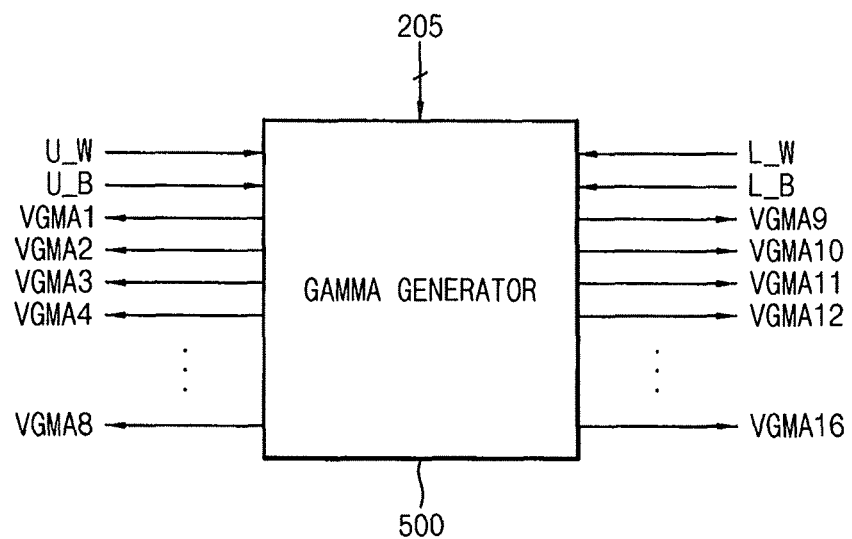
FIG. 3 is a conceptual diagram illustrating the gamma generator of FIG. 1 according to an exemplary embodiment of the present inventive concept.
FIG. 4 is a conceptual diagram illustrating a look-up table applied to the gamma generator of FIG. 3 according to an exemplary embodiment of the present inventive concept.
Figure 5A:
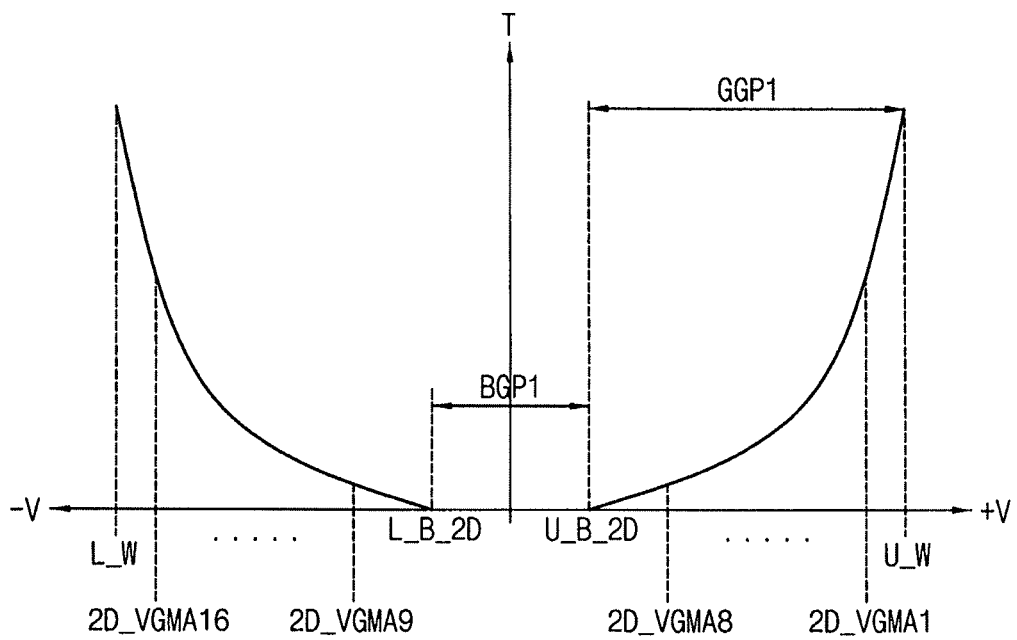
FIGS. 5A and 5B are graphs illustrating a voltage-transmission (VT) curve applied to the gamma generator of FIG. 3 according to an exemplary embodiment of the present inventive concept.
Figure 5B:
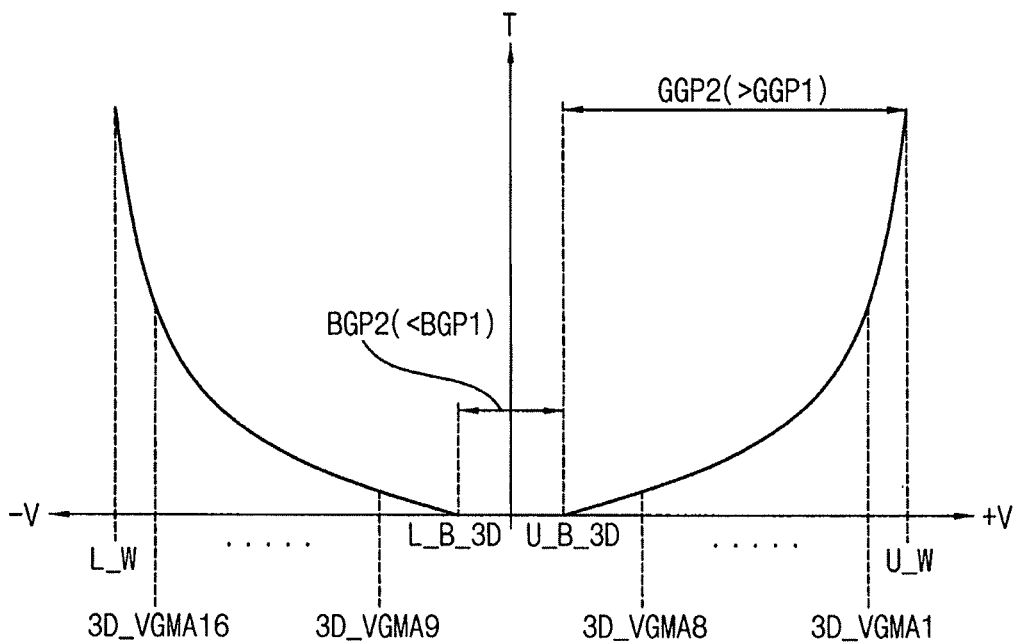

FIG. 3 is a conceptual diagram illustrating the gamma generator of FIG. 1 according to an exemplary embodiment of the present inventive concept. FIG. 4 is a conceptual diagram illustrating a look-up table applied to the gamma generator of FIG. 3 according to an exemplary embodiment of the present inventive concept. FIGS. 5A and 5B are graphs illustrating a voltage-transmission (VT) curve applied to the gamma generator of FIG. 3 according to an exemplary embodiment of the present inventive concept.

Herein, referring to the figures, U_B may be used to represent the first 2D black voltage U_B_2D with reference to the 2D mode and the first 3D black voltage U_B_3D with reference to the 3D mode, L_B may be used to represent the second 2D black voltage L_B_2D with reference to the 2D mode and the second 3D black voltage L_B_3D with reference to the 3D mode, and VGMA1 to VGMA16 may be used to represent the plurality of 2D gamma voltages 2D_VGMA1 to 2D_VGMA16 with reference to the 2D mode and the plurality of 3D gamma voltages 3D_VGMA1 to 3D_VGMA16 with reference to the 3D mode.

Referring to FIGS. 3, 4 and 5A, in the 2D mode, the gamma generator 500 receives a plurality of 2D reference gamma voltages 401 from the reference gamma generator 400. The plurality of 2D reference gamma voltages 401 includes, for example, a first 2D white voltage U_W and a first 2D black voltage U_B_2D which have a first polarity, and a second 2D black voltage L_B_2D and a second 2D white voltage L_W which have a second polarity opposite to the first polarity with respect to the reference voltage.

In addition, the gamma generator 500 receives the 2D gamma data 205 from the timing controller 200. As shown in FIG. 4, the 2D gamma data 2D_GMA1 to 2D_GMA16 are information data of the plurality of 2D gamma voltages 2D_VGMA1 to 2D_VGMA16 which are determined based on a 2D gamma curve. Herein, the number of the gamma voltages may be referred to as 16, however, the number of gamma voltages are not limited thereto.

The gamma generator 500 divides a voltage difference between the first 2D white voltage U_W and the first 2D black voltage U_B_2D based on the first to eighth 2D gamma data 2D_GMA1 to 2D_GMA8, and then generates first to eighth 2D gamma voltages 2D_VGMA1 to 2D_VGMA8 of the first polarity.

In the 2D mode, the first 2D white voltage U_W is a white grayscale voltage of the first polarity corresponding to a white grayscale, and the first 2D black voltage U_B_2D is a black grayscale voltage of the first polarity corresponding to a black grayscale. The first to eighth 2D gamma voltages 2D_VGMA1 to 2D_VGMA8 are middle grayscale voltages of the first polarity corresponding to middle grayscales. The data driver 600 may generate remaining grayscale voltages of the first polarity using the first to eighth 2D gamma voltages 2D_VGMA1 to 2D_VGMA8 received from the gamma generator 500.

In addition, the gamma generator 500 divides a voltage difference between the second 2D black voltage L_B_2D and the second 2D white voltage L_W based on the 9th to 16th 2D gamma data 2D_GMA9 to 2D_GMA16, and then generates 9th to 16th 2D gamma voltages 2D_VGMA9 to 2D_VGMA16 of the second polarity.

In the 2D mode, the second 2D white voltage L_W is a white grayscale voltage of the second polarity corresponding to the white grayscale, and the second 2D black voltage L_B_2D is a black grayscale voltage of the second polarity corresponding to the black grayscale. The 9th to 16th 2D gamma voltages 2D_VGMA9 to 2D_VGMA16 are middle grayscale voltages of the second polarity corresponding to the middle grayscales. The data driver 600 may generate remaining grayscale voltages of the second polarity using the 9th to 16th 2D gamma voltages 2D_VGMA9 to 2D_VGMA16 received from the gamma generator 500.

As shown in FIG. 5A, in the 2D mode, there is a first black gap BGP1 between the first 2D black voltage U_B_2D and the second 2D black voltage L_B_2D. Thus, there is a first middle grayscale gap GGP1 between the 2D black voltage and the 2D white voltage U_B_2D and U_W, or L_B_2D and L_W.

Referring to FIGS. 3, 4 and 5B, in the 3D mode, the gamma generator 500 receives a plurality of 3D reference gamma voltages 401 from the reference gamma generator 400. The plurality of 3D reference gamma voltages includes a first 3D white voltage U_W and a first 3D black voltage U_B_3D which have a first polarity, and a second 3D black voltage L_B_3D and a second 3D white voltage L_W which have a second polarity opposite to the first polarity with respect to the reference voltage.

In addition, the gamma generator 500 receives the 3D gamma data 205 from the timing controller 200. As shown in FIG. 4, the 3D gamma data 3D_GMA1 to 3D_GMA16 are information data of the plurality of 3D gamma voltages 3D_VGMA1 to 3D_VGMA16 which are determined based on a 3D gamma curve.

The gamma generator 500 divides a voltage difference between the first 3D white voltage U_W and the first 3D black voltage U_B_3D based on the first to eighth 3D gamma data 3D_GMA1 to 3D_GMA8, and then generates first to eighth 3D gamma voltages 3D_VGMA1 to 3D_VGMA8 of the first polarity.

In the 3D mode, the first 3D white voltage U_W is a white grayscale voltage of the first polarity corresponding to a white grayscale, and the first 3D black voltage U_B_3D is a black grayscale voltage of the first polarity corresponding to a black grayscale. The first to eighth 3D gamma voltages 3D_VGMA1 to 3D_VGMA8 are middle grayscale voltages of the first polarity corresponding to middle grayscales. The data driver 600 may generate remaining grayscale voltages of the first polarity using the first to eighth 3D gamma voltages 3D_VGMA1 to 3D_VGMA8 received from the gamma generator 500.

In addition, the gamma generator 500 divides a voltage difference between the second 3D black voltage L_B_3D and the second 3D white voltage L_W based on the 9th to 16th 3D gamma data 3D_GMA9 to 3D_GMA16, and generates 9th to 16th 3D gamma voltages 3D_VGMA9 to 3D_VGMA16 of the second polarity.

In the 3D mode, the second 3D white voltage L_W is a white grayscale voltage of the second polarity corresponding to the white grayscale, and the second 3D black voltage L_B_3D is a black grayscale voltage of the second polarity corresponding to the black grayscale. The 9th to 16th 3D gamma voltages 3D_VGMA9 to 3D_VGMA16 are middle grayscale voltages of the second polarity corresponding to the middle grayscales. The data driver 600 may generate remaining grayscale voltages of the second polarity using the 9th to 16th 3D gamma voltages 3D_VGMA9 to 3D_VGMA16 received from the gamma generator 500.

As shown in FIG. 5B, in the 3D mode, there is a second black gap BGP2 between the first 3D black voltage U_B_3D and the second 3D black voltage L_B_3D. Thus, there is a second middle grayscale gap GGP2 between the 3D black voltage and the 3D white voltage U_B_3D and U_W, or L_B_3D and L_W.

Referring to FIGS. 5A and 5B, the second black gap BGP2 in the 3D mode is less than the first black gap BGP1 in the 2D mode. However, the second middle grayscale gap GGP2 in the 3D mode is greater than the first middle grayscale gap GGP1 in the 2D mode.

According to exemplary embodiments of the present inventive concept, when the black gap is increased in the 2D mode, display characteristics such as, for example, a constant ratio, a luminance of a low grayscale, an after-image, response time, power consumption, crosstalk, etc. may be improved. In addition, according to exemplary embodiments, when the black gap is increased in the 3D mode, display characteristics such as, for example, luminance change, 3D crosstalk, etc. may be improved.

Therefore, according to exemplary embodiments of the present inventive concept, the black gap is determined to be different in the 2D mode and the 3D mode, resulting in improved performance in the 2D mode and the 3D mode.

Figure 6:
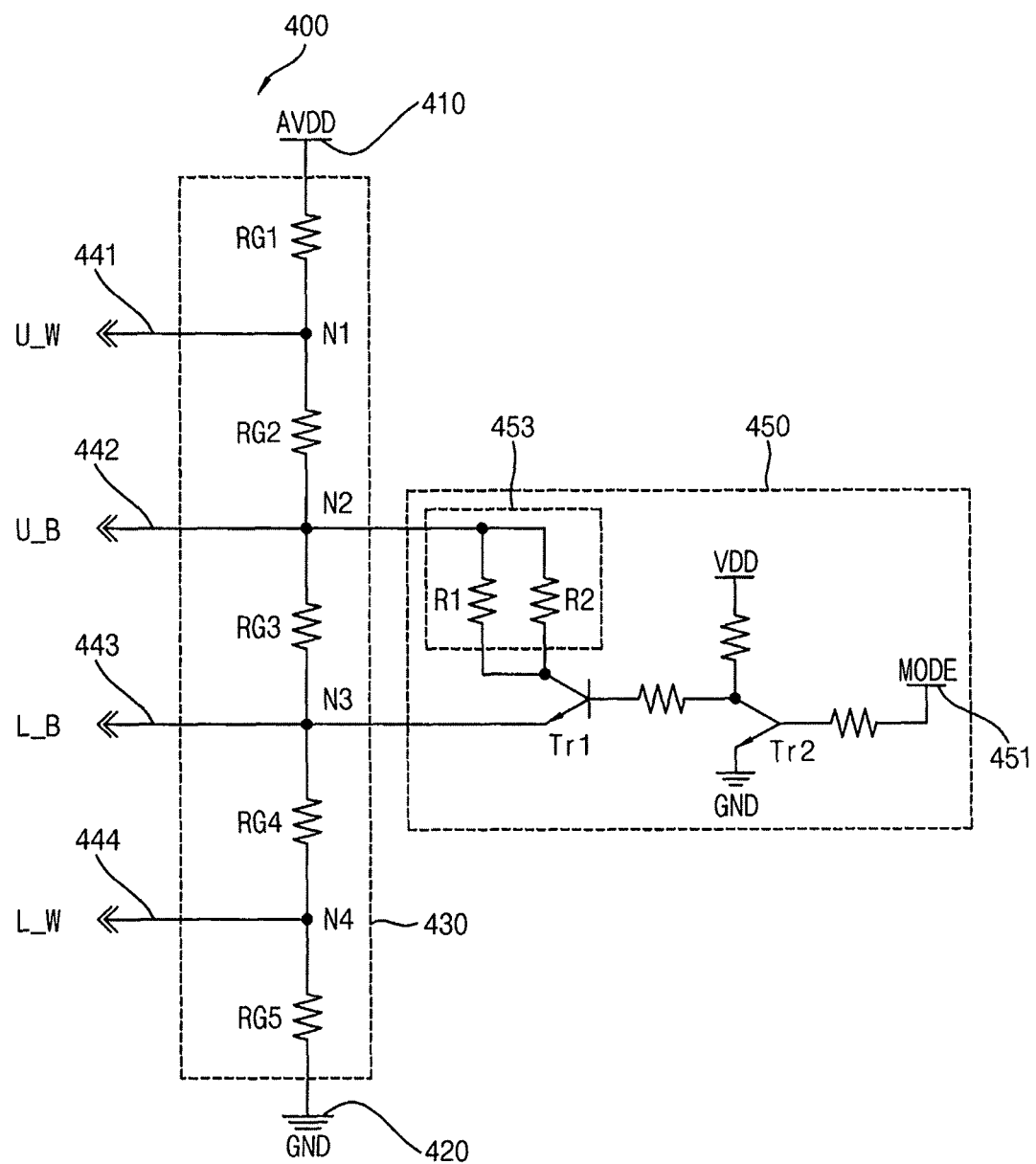
FIG. 6 is a circuit diagram illustrating the reference gamma generator according to an exemplary embodiment of the present inventive concept.
Figure 7A:
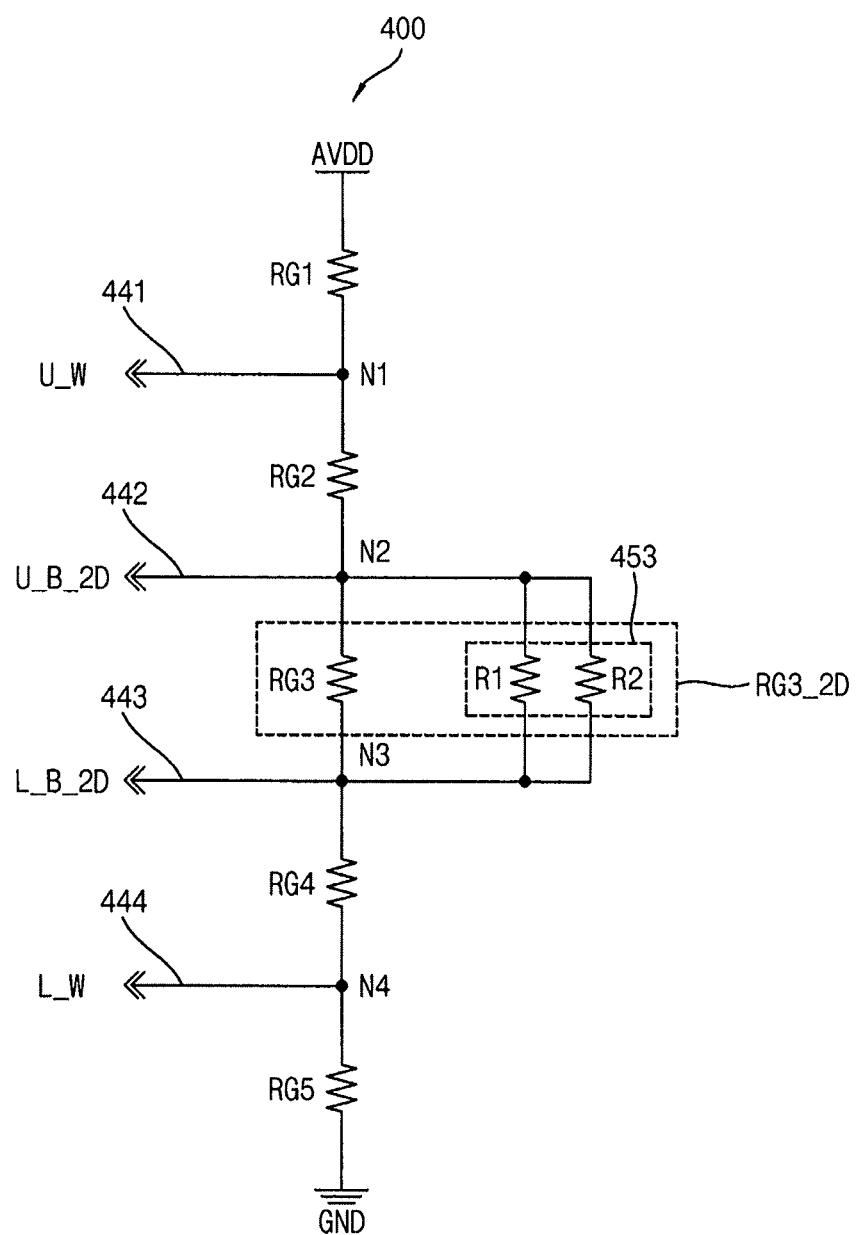
FIGS. 7A and 7B are conceptual diagrams illustrating the reference gamma generator of FIG. 6 according to an exemplary embodiment of the present inventive concept.
Figure 7B:
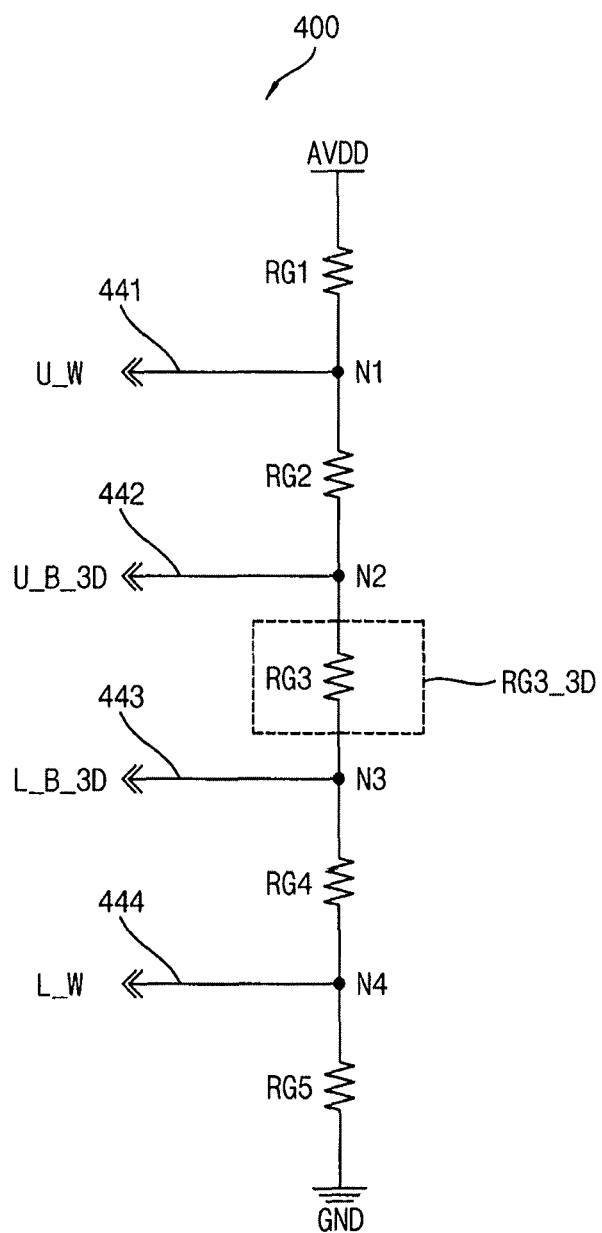

FIG. 6 is a circuit diagram illustrating the reference gamma generator according to an exemplary embodiment of the present inventive concept. FIGS. 7A and 7B are conceptual diagrams illustrating the reference gamma generator of FIG. 6 according to an exemplary embodiment of the present inventive concept.

In FIG. 6, RG3 may represent the third resistor element RG3_2D with reference to the 2D mode and the third resistor element RG3_3D with reference to the 3D mode.

Referring to FIG. 6, the reference gamma generator 400 may include a first voltage terminal 410, a second voltage terminal 420, a resistor string 430, a first output terminal 441, a second output terminal 442, a third output terminal 443, a fourth output terminal 444, and a resistance controller 450.

The first voltage terminal 410 receives a source voltage AVDD.

The second voltage terminal 420 receives a ground voltage GND.

The resistor string 430 includes a plurality of resistor elements which are connected to each other in a string formation. The resistor string 430 may include a first resistor element RG1, a second resistor element RG2, a third resistor element RG3, a fourth resistor element RG4, and a fifth resistor element RG5.

The first to fifth resistor elements RG1, RG2, RG3, RG4, and RG5 are arranged between the first voltage terminal 410 and the second voltage terminal 420, and each of the first to fifth resistor elements RG1, RG2, RG3, RG4, and RG5 may include at least one resistor element.

The first output terminal 441 is connected to a first node N1 which connects the first and second resistor elements RG1 and RG2. The first output terminal 441 outputs a first 2D white voltage U_W, which is divided from the source voltage AVDD by the first and second resistor elements RG1 and RG2.

The second output terminal 442 is connected to a second node N2 which connects the second and third resistor elements RG2 and RG3. The second output terminal 442 outputs a first 2D black voltage U_B, which is divided from a voltage of the first node N1 by the second and third resistor elements RG2 and RG3.

The third output terminal 443 is connected to a third node N3 which connects the third and fourth resistor elements RG3 and RG4. The third output terminal 443 outputs a second 2D black voltage L_B, which is divided from a voltage of the second node N2 by the third and fourth resistor elements RG3 and RG4.

The fourth output terminal 444 is connected to a fourth node N4 which connects the fourth and fifth resistor elements RG4 and RG5. The fourth output terminal 444 outputs a second 2D white voltage L_W, which is divided from a voltage of the third node N3 by the fourth and fifth resistor elements RG4 and RG5.

The resistance controller 450 is connected to the second and third nodes N2 and N3. The resistance controller 450 controls a resistance value between the second and third nodes in response to the mode signal MODE. The resistance controller 450 may include an input terminal 451, a parallel resistor element 453, a first transistor Tr1, and a second transistor Tr2.

The input terminal 451 receives the mode signal MODE corresponding to a 2D and a 3D mode from the timing controller 200. For example, in an exemplary embodiment, when the mode signal MODE has a high level, the display panel is driven in a 3D mode, and when the mode signal MODE has a low level, the display panel is driven in a 2D mode.

The parallel resistor element 453 is connected to the second node N2 and includes at least two resistor elements R1 and R2, which are connected between the second and third nodes N2 and N3 in parallel.

The first transistor Tr1 is connected to the second and third nodes N2 and N3 through the parallel resistor element 453.

The first transistor Tr1 includes a control electrode which is connected to the second transistor Tr2, an input electrode which is connected to the second node N2 through the parallel resistor element 453, and an output electrode which is directly connected to the third node N3. The control electrode of the first transistor Tr1 receives the driving voltage VDD (e.g., a high level), or a ground voltage GND (e.g., a low level) based on the state of the second transistor Tr2 (e.g., based on turning-on or turning-off of the second transistor Tr2).

The second transistor Tr2 controls the turning-on or turning-off of the first transistor Tr1 in response to the mode signal MODE.

The second transistor Tr2 includes a control electrode which is connected to the input terminal, an input electrode which is connected to the control electrode of the first transistor Tr1, and an output electrode which is connected to ground GND. The input electrode of the second transistor Tr2 receives the driving voltage VDD.

Referring to FIGS. 5A, 6 and 7A, in the 2D mode, the mode signal MODE has a low level.

The second transistor Tr2 turns off in response to the mode signal MODE of the low level. Thus, the driving voltage VDD is applied to the control electrode of the first transistor Tr1.

The first transistor Tr1 turns on in response to the driving voltage VDD. When the first transistor Tr1 turns on, the second node N2 is connected to the third node N3 through the third resistor element RG3 and the parallel resistor element 453, which are connected to each other in parallel. Thus, the second node N2 is connected to the third node N3 through a third resistor element RG3_2D in the 2D mode, which has a resistance value less than that of the third resistor element RG3.

Therefore, the first output terminal 441 outputs a first white voltage U_W, which is divided from the source voltage AVDD by the first and second resistor elements RG1 and RG2. The second output terminal 442 outputs a first 2D black voltage U_B_2D, which is divided from a voltage of the first node N1 by the second and third resistor elements RG2 and RG3_2D. The third output terminal 443 outputs a second 2D black voltage LB_2D, which is divided from a voltage of the second node N2 by the third and fourth resistor elements RG3_2D and RG4. The fourth output terminal 444 outputs a second white voltage L_W, which is divided from a voltage of the third node N3 by the fourth and fifth resistor elements RG4 and RG5.

The third resistor element RG3_2D for the 2D mode controls the first 2D black voltage U_B_2D and the second 2D black voltage L_B_2D, and has a first resistance value. Thus, a first black gap BGP1 between the first 2D black voltage U_B_2D and the second 2D black voltage L_B_2D may be determined by the first resistance value of the third resistor element RG3_2D for the 2D mode.

Referring to FIGS. 5B, 6 and 7B, in an exemplary embodiment, in the 3D mode, the mode signal MODE has a high level.

The second transistor Tr2 turns on in response to the mode signal MODE of the high level. Thus, when the second transistor Tr2 turns on, the driving voltage VDD is discharged to the ground voltage GND.

The control electrode of the first transistor Tr1 receives the ground voltage GND of a low level. The first transistor Tr1 turns off in response to the ground voltage GND. When the first transistor Tr1 turns off, the second node N2 is connected to the third node N3 through only the third resistor element RG3. Thus, the second node N2 is connected to the third node N3 through a third resistor element RG3_3D in the 3D mode which has a resistance value substantially equal to that of the third resistor element RG3.

Therefore, the first output terminal 441 outputs the first white voltage U_W, which is divided from the source voltage AVDD by the first and second resistor elements RG1 and RG2. The second output terminal 442 outputs a first 3D black voltage UB_3D, which is divided from a voltage of the first node N1 by the second and third resistor elements RG2 and RG3_3D. The third output terminal 443 outputs a second 3D black voltage L_B_3D, which is divided from a voltage of the second node N2 by the third and fourth resistor elements RG3_3D and RG4. The fourth output terminal 444 outputs a second white voltage L_W, which is divided from a voltage of the third node N3 by the fourth and fifth resistor elements RG4 and RG5.

The third resistor element RG3_3D for the 3D mode controls the first 3D black voltage U_B_3D and the second 3D black voltage L_B_3D, and has a second resistance value that is greater than the first resistance value. Therefore, a second black gap BGP2 between the first 3D black voltage U_B_3D and the second 3D black voltage L_B_3D is less than the first black gap BGP1 due to the second resistance value of the third resistor element RG3_3D for the 3D mode.

In accordance with the above description, according to an exemplary embodiment of the present inventive concept, a method of driving a display panel may include determining a first black gap corresponding to a two-dimensional (2D) mode and a second black gap corresponding to a three-dimensional (3D) mode. The first and second black gaps are different from each other, the first and second black gaps correspond to a voltage difference between a black voltage of a first polarity and a black voltage of a second polarity, and the first and second polarities are opposite to each other with respect to a reference voltage. The method further includes dividing a voltage difference between a white voltage of the first polarity and the black voltage of the first polarity to generate a plurality of gamma voltages of the first polarity, and dividing a voltage difference between a white voltage of the second polarity and the black voltage of the second polarity to generate a plurality of gamma voltages of the second polarity.

Further, according to an exemplary embodiment of the present inventive concept, a method of driving a display panel includes generating a plurality of reference gamma voltages corresponding to a two-dimensional (2D) mode and a plurality of reference gamma voltages corresponding to a three-dimensional (3D) mode based on a mode signal indicating a driving mode of the display panel. The plurality of reference gamma voltages corresponding to the 2D mode is different from the plurality of reference gamma voltages corresponding to the 3D mode. The method further includes generating a plurality of gamma voltages using the pluralities of reference gamma voltages, and generating a plurality of data voltages using the plurality of gamma voltages to drive a plurality of data lines of the display panel.

According to exemplary embodiments of the present inventive concept, when the black gap is increased in the 2D mode, display characteristics such as, for example, a constant ratio, a luminance of a low grayscale, an after-image, response time, power consumption, crosstalk, etc. may be improved. In addition, according to exemplary embodiments, when the black gap is increased in the 3D mode, display characteristics such as, for example, luminance change, 3D crosstalk, etc. may be improved.

According to exemplary embodiments of the present inventive concept, the black gap between the black voltage of the first polarity and the black voltage of the second polarity are determined to be different from each other according to the 2D mode and the 3D mode. As a result, improved performance may be obtained in the 2D mode and the 3D mode.

While the present inventive concept has been particularly shown and described with reference to the exemplary embodiments thereof, it will be understood by those of ordinary skill in the art that various changes in form and detail may be made therein without departing from the spirit and scope of the present inventive concept as defined by the following claims.

What is claimed is:

1. A method of driving a display panel, comprising:
generating a plurality of reference gamma voltages corresponding to a two-dimensional (2D) mode and a plurality of reference gamma voltages corresponding to a three-dimensional (3D) mode based on a mode signal indicating a driving mode of the display panel,
wherein the plurality of reference gamma voltages corresponding to the 2D mode is different from the plurality of reference gamma voltages corresponding to the 3D mode;
generating a plurality of gamma voltages using the plurality of reference gamma voltages; and
generating a plurality of data voltages using the plurality of gamma voltages to drive a plurality of data lines of the display panel,
wherein a first black gap between a first 2D black voltage having a first polarity and a second 2D black voltage having a second polarity among the plurality of reference gamma voltages for the 2D mode is greater than a second black gap between a first 3D black voltage having the first polarity and a second 3D black voltage having the second polarity among the plurality of reference gamma voltages for the 3D mode.

2. The method of claim 1 wherein
the plurality of reference gamma voltages corresponding to the 2D mode comprises a first 2D white voltage and a first 2D black voltage having the first polarity, and a second 2D white voltage and a second 2D black voltage having the second polarity, wherein the first and second polarities are opposite to each other with respect to a reference voltage, and
the plurality of reference gamma voltages corresponding to the 3D mode comprises a first 3D white voltage and a first 3D black voltage having the first polarity, and a second 3D white voltage and a second 3D black voltage having the second polarity.

3. The method of claim 2, wherein
a first middle gap between the first 2D white voltage and the first 2D black voltage is less than a second middle gap between the first 3D white voltage and the first 3D black voltage, and
a first middle gap between the second 2D white voltage and the second 2D black voltage is less than a second middle gap between the second 3D white voltage and the second 3D black voltage.

4. The method of claim 2, wherein the first 2D white voltage is equal to the first 3D white voltage, and the second 2D white voltage is equal to the second 3D white voltage.

5. The method of claim 2, wherein generating the plurality of reference gamma voltages comprises:
dividing a voltage difference between the first 2D white voltage and the first 2D black voltage based on a 2D gamma curve to generate a plurality of 2D gamma voltages of the first polarity; and
dividing a voltage difference between the second 2D white voltage and the second 2D black voltage based on the 2D gamma curve to generate a plurality of 2D gamma voltages of the second polarity.

6. The method of claim 5, wherein generating the plurality of reference gamma voltages further comprises:
dividing a voltage difference between the first 3D white voltage and the first 3D black voltage based on a 3D gamma curve to generate a plurality of 3D gamma voltages of the first polarity; and dividing a voltage difference between the second 3D white voltage and the second 3D black voltage based on the 3D gamma curve to generate a plurality of 3D gamma voltages of the second polarity.

7. A display apparatus, comprising:

a display panel comprising a plurality of pixels connected to a plurality of data lines and a plurality of gate lines crossing the plurality of data lines;

a reference gamma generator configured to generate a plurality of reference gamma voltages corresponding to a two-dimensional (2D) mode and a plurality of reference gamma voltages corresponding to a three-dimensional (3D) mode based on a mode signal indicating a driving mode of the display panel, wherein the plurality of reference gamma voltages corresponding to the 2D mode is different from the plurality of reference gamma voltages corresponding to the 3D mode;

a gamma generator configured to divide voltage differences between the plurality of reference gamma voltages to generate a plurality of gamma voltages; and a data driver configured to generate a plurality of data voltages using the plurality of gamma voltages to drive the plurality of data lines, wherein a first black gap between a first 2D black voltage having a first polarity and a second 2D black voltage having a second polarity among the plurality of reference gamma voltages for the 2D mode is greater than a second black gap between a first 3D black voltage having the first polarity and a second 3D black voltage having the second polarity among the plurality of reference gamma voltages for the 3D mode.

8. The display apparatus of claim 7, wherein the plurality of reference gamma voltages corresponding to the 2D mode comprises a first 2D white voltage and a first 2D black voltage having the first polarity, and a second 2D white voltage and a second 2D black voltage having the second polarity, wherein the first and second polarities are opposite to each other with respect to a reference voltage, and the plurality of reference gamma voltages corresponding to the 3D mode comprises a first 3D white voltage and a first 3D black voltage having the first polarity, and a second 3D white voltage and a second 3D black voltage having the second polarity.

9. The display apparatus of claim 7, wherein a first middle gap between the first 2D white voltage and the first 2D black voltage is less than a second middle gap between the first 3D white voltage and the first 3D black voltage, and a first middle gap between the second 2D white voltage and the second 2D black voltage is less than a second middle gap between the second 3D white voltage and the second 3D black voltage.

10. The display apparatus of claim 7, wherein the first 2D white voltage is equal to the first 3D white voltage, and the second 2D white voltage is equal to the second 3D white voltage.

11. The display apparatus of claim 7, wherein the gamma generator is configured to divide a voltage difference between the first 2D white voltage and the first 2D black voltage based on a 2D gamma curve to generate a plurality of 2D gamma voltages of the first polarity, and to divide a voltage difference between the second 2D white voltage and the second 2D black voltage based on the 2D gamma curve to generate a plurality of 2D gamma voltages of the second polarity.

12. The display apparatus of claim 11, wherein the gamma generator is configured to divide a voltage difference between the first 3D white voltage and the first 3D black voltage based on a 3D gamma curve to generate a plurality of 3D gamma voltages of the first polarity, and to divide a voltage difference between the second 3D white voltage and the second 3D black voltage based on the 3D gamma curve to generate a plurality of 3D gamma voltages of the second polarity.

13. The display apparatus of claim 7, wherein the reference gamma generator comprises:

a resistor string comprising a first resistor element, a second resistor element, a third resistor element, a fourth resistor element, a fifth resistor element, and a sixth resistor element sequentially connected to each other;

a first output terminal connected to a first node, wherein the first node connects the first and second resistor elements and outputs the first 2D white voltage or the first 3D white voltage;

a second output terminal connected to a second node, wherein the second node connects the second and third resistor elements and outputs the first 2D black voltage or the first 3D black voltage;

a third output terminal connected to a third node, wherein the third node connects the third and fourth resistor elements and outputs the second 2D black voltage or the second 3D black voltage;

a fourth output terminal connected to the fourth node, wherein the fourth node connects the fourth and fifth resistor elements and outputs the second 2D white voltage or the second 3D white voltage; and a resistance controller connected to the second and third nodes and configured to control a resistance value between the second and third nodes in response to the mode signal.

14. The display apparatus of claim 13, wherein the resistance controller decreases the resistance value between the second and third nodes when the mode signal is a 2D mode signal.

15. The display apparatus of claim 13, wherein the resistance controller comprises:

a parallel resistor element connected to the third resistor element in parallel;

a first transistor connected to the second and third nodes through the parallel resistor element; and a second transistor configured to turn-on or turn-off the first transistor in response to the mode signal.

16. The display apparatus of claim 15, wherein the first transistor is turned-on and the third resistor element between the second and third nodes is connected to the parallel resistor element in parallel when the mode signal is a 2D mode signal, and the first transistor is turned-off and the third resistor element between the second and third nodes is not connected to the parallel resistor element when the mode signal is a 3D mode signal.

* * * * *